US009124856B2

(12) United States Patent
Deshpande et al.

(10) Patent No.: US 9,124,856 B2
(45) Date of Patent: Sep. 1, 2015

(54) METHOD AND SYSTEM FOR VIDEO EVENT DETECTION FOR CONTEXTUAL ANNOTATION AND SYNCHRONIZATION

(75) Inventors: Nikhil Deshpande, Pennington, NJ (US); Yuecheng Zhang, Princeton, NJ (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 181 days.

(21) Appl. No.: 13/601,090

(22) Filed: Aug. 31, 2012

(65) Prior Publication Data
US 2014/0064693 A1 Mar. 6, 2014

(51) Int. Cl.
*H04N 9/80* (2006.01)
*H04N 9/82* (2006.01)
*H04N 21/482* (2011.01)

(52) U.S. Cl.
CPC ......... *H04N 9/8205* (2013.01); *H04N 21/4828* (2013.01)

(58) Field of Classification Search
CPC ... G06F 17/00; G06F 17/30796; H04N 21/00; H04N 9/00; H04N 21/4828; H04N 21/4884
See application file for complete search history.

(56) References Cited

U.S. PATENT DOCUMENTS

| 7,747,434 | B2 | 6/2010 | Flanagan et al. | |
|---|---|---|---|---|
| 2004/0130567 | A1 | 7/2004 | Ekin et al. | |
| 2006/0239645 | A1* | 10/2006 | Curtner et al. | 386/95 |
| 2007/0118373 | A1 | 5/2007 | Wise et al. | |
| 2007/0204310 | A1* | 8/2007 | Hua et al. | 725/88 |
| 2008/0107392 | A1* | 5/2008 | Grannan et al. | 386/83 |
| 2008/0143880 | A1 | 6/2008 | Jung et al. | |
| 2008/0244637 | A1* | 10/2008 | Candelore | 725/28 |
| 2009/0009532 | A1 | 1/2009 | Hallberg | |
| 2010/0030350 | A1 | 2/2010 | House et al. | |
| 2010/0246965 | A1 | 9/2010 | Epshtein et al. | |
| 2010/0265397 | A1* | 10/2010 | Dasher et al. | 348/468 |
| 2011/0145858 | A1* | 6/2011 | Philpott et al. | 725/32 |
| 2013/0167170 | A1* | 6/2013 | Klappert et al. | 725/25 |

OTHER PUBLICATIONS

Babaguchi et al., "*Event Based Indexing of Broadcasted Sports Video by Intermodal Collaboration*", IEEE Transactions on Multimedia, Mar. 2002, vol. 4, No. 1, pp. 68-75.
Zhang et al., "*Event detection in baseball video using superimposed caption recognition*", 4 pages.
http://dev.signumbt.com/motion-sports-analysis/signum.RTA; 2 pages.
http://www.nacsport.com/; 2 pages.

* cited by examiner

*Primary Examiner* — Huy T Nguyen
(74) *Attorney, Agent, or Firm* — Fay Kaplun & Marcin, LLP

(57) ABSTRACT

Described herein are methods and systems for video event detection for contextual annotation and synchronization. Exemplary embodiments relate to a method comprising receiving a video stream, extracting a first event from the video stream, determining an index value identifying a location within the video stream corresponding to the first event, and inserting content based on the first event at a location identified by the index value. Further exemplary embodiments relate to a system comprising an event-based data extractor that receives a video stream and extracts a first event from the video stream, a processor that determines an index value identifying a location within the video stream corresponding to the first event, and a video insertion module inserts content based on the first event at a location identified by the index value.

17 Claims, 4 Drawing Sheets

Screenshot 100

METHOD AND SYSTEM FOR VIDEO EVENT DETECTION FOR CONTEXTUAL ANNOTATION AND SYNCHRONIZATION

BACKGROUND

The extraction of critical events relevant to a broadcast sporting event is a manual and time-consuming task. This is typically performed by video annotators who view a recording of the event and manually scrub through the video to annotate the video in order to break the video into segments for future use. Time codes embedded in the video are typically used as the mode of identifying the segment of the video that is relevant. Accordingly, the ability to extract these types of data and synchronize with video is a challenge.

Sporting activities contain repeating events of fine granularity, such as clocks and timers, which are independent of the play action, as well as events that are dependent on the action of the players. One currently used broadcast methodology for enhancing the fan experience is to embed this data by rendering a graphical representation of it into the video program. For example, an on-screen dashboard typically shows information such as scores, game-clocks, shot-clocks, etc. Recently, there has been an increase in the amount of data that is being displayed in these on-screen dashboards.

A further methodology sends out-of-band data for the sporting event. However, the transmission path for the out-of-band data may be asynchronous and exhibit a non-deterministic delay. For example, player positions at specific points in a basketball game referenced to a game-clock may be collected as the game is in progress. This information may then be sent to a remote server for analysis and data mining. However, the ability to extract these types of data and synchronize the data with the corresponding video-program is a challenge. Methods that correlate event-based data extracted from out-of-band data source and in-band data source are required to facilitate synchronization between these two sources allowing for video-program enhancement with event-based content and event-based indexing of a video database.

SUMMARY OF THE INVENTION

The exemplary embodiments are related to methods and systems for video event detection for contextual annotation and synchronization. Exemplary embodiments relate to a method comprising receiving a video stream, extracting a first event from the video stream, determining an index value identifying a location within the video stream corresponding to the first event, and inserting content based on the first event at a location identified by the index value.

Further exemplary embodiments relate to a system comprising an event-based data extractor that receives a video stream and extracts a first event from the video stream, a processor that determines an index value (e.g., a frame number or a timecode) identifying a location within the video stream corresponding to the first event, and a video insertion module inserts content based on the first event at a location identified by the index value determined by the processor.

Further exemplary embodiments relate to a non-transitory computer readable storage medium including a set of instructions executable by a processor, the set of instructions, when executed, resulting in a performance of receiving a video stream, extracting a first event from the video stream, determining an index value identifying a location within the video stream corresponding to the first event, and inserting content based on the first event at a location identified by the index value.

DETAILED DESCRIPTION

Figure 1:
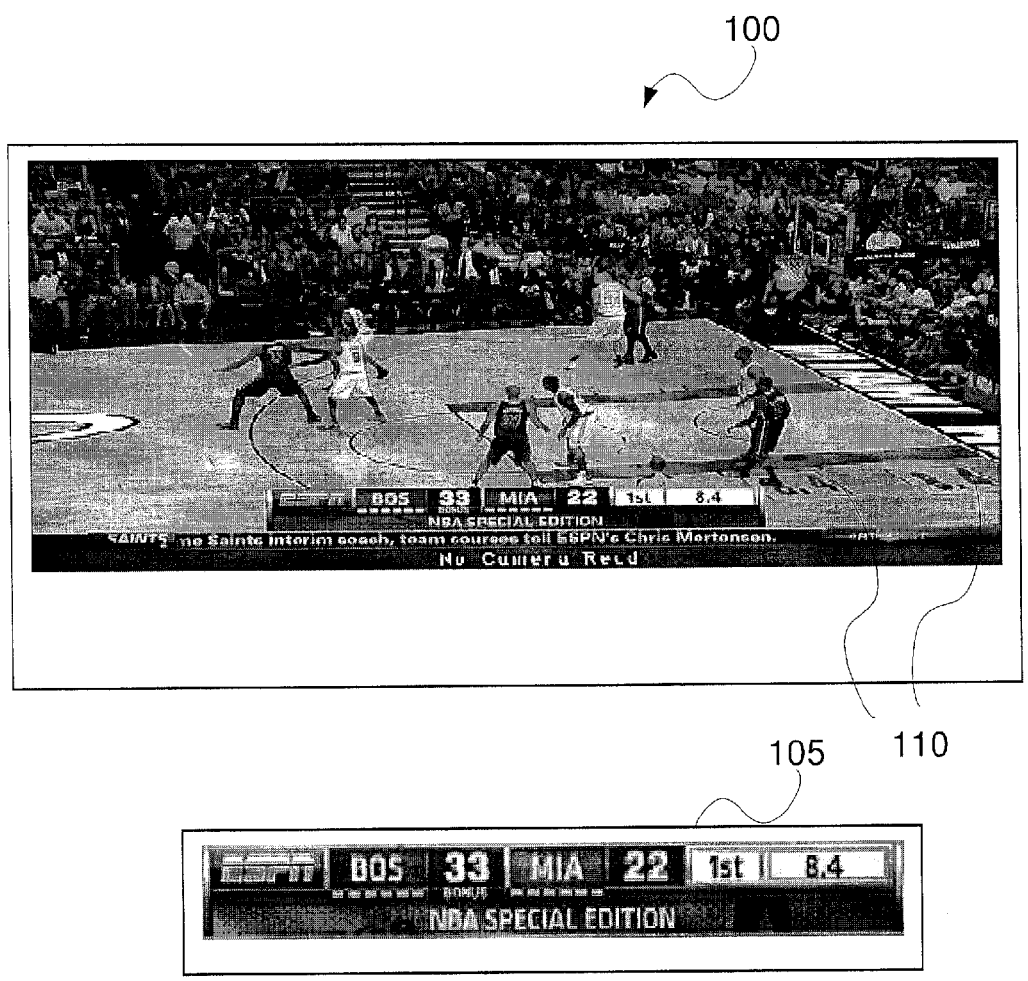
FIG. 1 shows an exemplary screenshot for extracting data from a score bug and inserting the data onto locations within the screenshot according to an exemplary embodiment.

The exemplary embodiments may be further understood with reference to the following description of exemplary embodiments and the related appended drawings, wherein like elements are provided with the same reference numerals. Specifically, the exemplary embodiments relate to methods and systems for video event detection for contextual annotation and synchronization.

According to the exemplary embodiments described herein, the systems and methods detailed below are based on the concept that the detection of well understood events in the video may be used to extract contextual information about the event for the particular sport. Furthermore, this extracted contextual information may be used to synchronize in-band or out-of-band data with the video frame they correspond to. It should be noted that while the exemplary embodiments are directed to video covering sporting events, the functionality described herein may also be applied to other types of video coverage that also have well-understood events according to the principles described herein.

An on-screen digital graphic, or "score bug," has become a standard feature on most sports programs. It appears that viewers of sporting events have found the score bugs to be a value-added feature of the broadcast and there is no indication that any attempt will be made to exclude this feature. In fact, most indications show an ever-expanding feature set for this score bug. The score bug content typically follows well-defined patterns of behavior mainly in response to live events related to the game progress. These patterns may be obtained either from the designer of the score bug system or from the analysis of a large sample set of games. For example, the designer of the score bug system may have programmed the bug to operate in a specific manner based on an event within the game (e.g., a background of the score bug turns a specific color when there is a touchdown or turnover in a football game). Thus, a change in appearance may be programmed into the exemplary system to indicate that an event or transition has occurred when it is detected within the video. On the other hand, by reviewing a large sample of games, the operation of the score bug in response to various events may be empirically determined. Additional examples of detectable events will be provided below.

It should be noted that while exemplary embodiments of the systems and methods described herein may detect events extracted based on processing of the on-screen score bug content, further embodiments may be expanded to use additional information sources, or a combination of information sources. For instance, additional information may include, but is not limited to, data generated from camera tracking, the detection of scene changes, player/object tracking information, and other derivative information from the game that is obtained directly from the image pixels of the video frame, from any other imaging modalities, or from real-time localization systems ("RTLS").

One exemplary embodiment of the video event detection system for contextual annotation and synchronization may be to associate event-based information with their corresponding video frames. For instance, the event-based data may be extracted from out-of-band feeds. In contrast to in-band data, out-of-band feeds are not embedded within the video and therefore a synchronization mechanism is required to correlate events extracted from these feeds with the corresponding video frame as well as with events extracted from the in-band data. Specifically, it may be desirable to perform game enhancements at the studio by virtually inserting content into a video-program. Note that the video-program (e.g., a video stream) typically composed at the event's site by the director who controls what camera will be switched-in to produce the video-program. This video-program is then sent to the studio, possibly by satellite transmission. At the studio, the received video-program is further enhanced resulting in the final video-broadcast that is then transmitted to the viewers via the various distribution centers.

At the studio, there are multiple video/data feeds that are used to compose the final video-broadcast. One main video feed is the video-program received from the venue and typically already includes the score bug graphics rendered into the video image. All information that may be extracted from this feed is referred to herein as in-band information (e.g., it is directly associated with the video frame it was extracted from). Other feeds of data may be received at the studio containing live information about the game in progress, gathered either manually or automatically, and sent via any communication link separately from the video-program. All information that may be extracted from this feed is referred to herein as out-of-band information (e.g., its association with the video frame it corresponds to is unknown). The exemplary methods and systems described herein may be used to extract event-based information from in-band and out-of-band data for video-program enhancement and event-based video retrieval.

As noted above, the shot-clock is one information type that may be present in an on-screen dashboard rendered into the video-program and is relatively insensitive to any compression artifacts due to data transmission methodologies. According to the exemplary systems and methods described herein, the shot-clock may be detected and read from the video image using an optical character recognition ("OCR") technique. Known in the art OCR techniques may utilize a combination of pattern recognition, artificial intelligence and computer vision to detect and read displayed data, such as the numbers on an on-screen shot-clock. Thus, the exemplary systems and methods may retrieve in-bound data such as the shot-clock data, along with the frame in which it was detected from, and pass this data to a virtual insertion system. The virtual insertion system may then accurately render a graphic, containing the shot-clock value, into the corresponding frame at a desired physical location on the court and with a perspective consistent with the camera's pose. As shown in FIG. 1, the shot-clock value of 8.4 seconds may be extracted from the score bug 105 and virtually inserted onto the court of screen-shot 100 at locations 110.

A further exemplary embodiment of the video event detection system for contextual annotation and synchronization may allow a sports annotator to rapidly access video segment. Specifically, as opposed to using manual indexing techniques, the events and their associated frame number, timecode, or any other indexing means (i.e. means of pointing within a video stream) may be saved and later be used for automatic retrieval of a video segment containing a desired searched for event in the video (e.g., a specific play in a game).

According to this embodiment, the on-screen dashboard may be continuously read throughout the game and scene change detectors may provide feedback on when the current scene has changed (e.g. due to a camera switch). Thus, basic game-related events (e.g., shot-clock time, game-clock time, score, period, etc.) may be detected and read using OCR techniques, for instance. Then, an embodiment of this invention may detect a composite event deducted from a combination of basic events. For instance, when the shot-clock is observed to reset to an initial setting (e.g., 24 seconds for an NBA game), the score of the game may then be checked to determine whether a change in score occurred. The video may then be annotated to signify a composite event, such as the event of a successful shot, based on the combination of basic detected events: 1) the resetting of the shot-clock indicative that a shot was taken, and 2) a change or no change in score indicative whether that shot was made or missed. Using this example, the sports annotator may be aware that a critical play happened with four minutes left on the clock in the 1st period. The annotator may now simply request for the system to jump directly to that context without the need to manually scrubbing the video.

Figure 2:
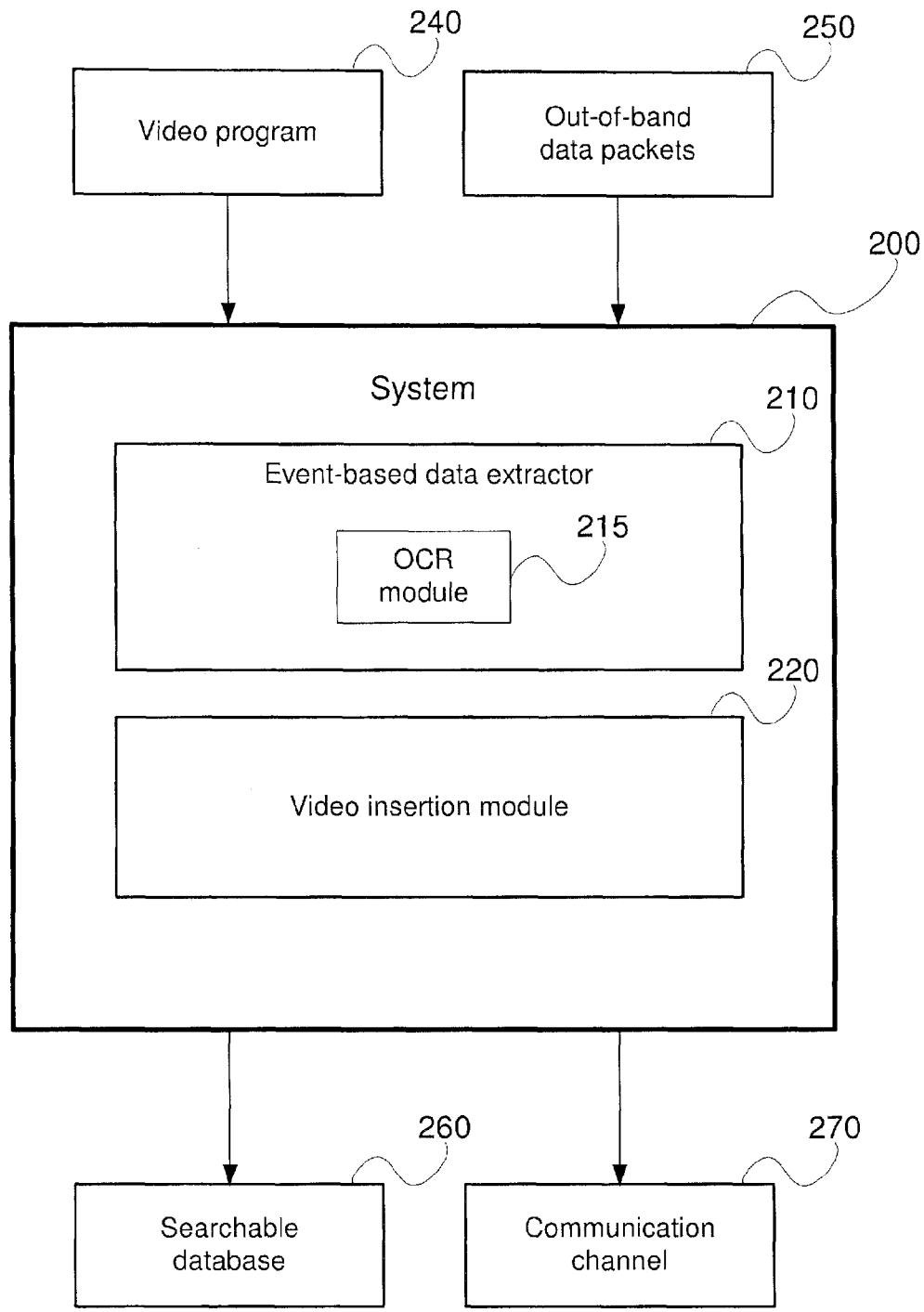
FIG. 2 shows an exemplary system for video event detection for contextual annotation and synchronization according to an exemplary embodiment.

FIG. 2 shows an exemplary system 200 for video event detection for contextual annotation and synchronization according to an exemplary embodiment. The exemplary system 200 may include event-based data extractor 210 that may include an OCR module 215 and a video insertion module 220.

The system 200 may receive video-program 240, covering a sporting event, including additional in-band information (metadata). For example, in-band information may be stored within the video-program stream as ancillary data packed in the vertical blanking interval ("VBI") area, and therefore is already synchronized with the video-program frames. Note that the term "in-band data" include the video-program and any metadata packed with it. In an embodiment, an on-screen dashboard may already be rendered into the video-program by the at venue production system.

The system 200 may also receive out-of-band data 250 possibly containing data related to the information displayed on the on-screen dashboard (e.g., play clock ON/OFF data, play clock value, etc.) or any other information related to the covered game such as other video/audio streams or metadata. Out-of-band data include information that is transmitted separately from the video-program stream, in contrast to in-band information that is packed within the video-program stream.

The event-based data extractor 210 may utilize the OCR component 215 to extract relevant data and events from the received program video 240. Specifically, the OCR component 215 may convert images within the frames of the program video into machine-encoded text. As noted above, the OCR component 215 may detect and extract numerical values on a shot-clock, or determine from the absence/presence of numerical values the operation of the shot-clock (ON or OFF), etc.

It should be noted that while the exemplary embodiments describe the technique of using OCR for extracting relevant event-based data from the program video 240, other data extraction techniques may also be used, depending on the context of the program video 240. For example, if the program video 240 includes closed caption text, this text may be scanned for specific words or phrases that indicate the occurrence of an event. Other non-textual based techniques may also be used such as characteristics of the program video 240 (e.g., color, density, intensity, etc.), as well as camera tracking techniques, a player/object tracking techniques, detection of scene changes, detection of changes in image pixels within frames of the program video 240, etc. Thus, it is not a requirement that the program video 240 include an on-screen dashboard, as these other techniques may be used to extract events. In such cases, the event-based data extractor 210 may include components in addition to the OCR module 215 to accomplish this additional functionality.

The video insertion module 220 may receive the information from the event-based data extractor 210. The information may include the event detected and the frame number of the video this event corresponds to. For example, if the on-screen dashboard includes a shot-clock decremented from a value of 11 seconds to a value of 10 seconds, the event-based data detector 210 will extract this event (e.g., clock decrement) and the frame at which the decrement occurred. This information may then be used by the video insertion module 220 to annotate the video-program 240 with an enhancement (e.g., shot-clock graphic) related to the event.

The event-based data extractor 210 may also correlate the information from the out-of-band data packets 250 with the information extracted from the video-program 240. For instance, the event-based data extractor 210 may use data in the out-of-band packets 250 to supplement the recognition of events extracted from video-program 240. For example, the out-of-band information 250 may include player/ball tracking information derived by a system at the venue in addition to the shot-clock and game-clock data. This information in combination with other information detectable by the event-based data extractor 210, such as motion tracking of players, may allow: 1) synchronization of in-bound and out-of-bound data, and 2) the recognition of higher level game events (e.g., composite events). An example for composite event may be the event of a certain player performing a certain act. Thus, upon recognition of events based on information received from the data packets 250 and information extracted from the frames of the video 240, video insertion module 220 may contemporaneously insert event related content into the broadcast.

In an embodiment of this invention an out-of-band data and in-band data may be synchronized based on recognition of correlated events extracted from the data in both sources. For example, the out-of-band information may be synchronized with the in-band information using: 1) the shot-clock information received from 250 and 2) the shot-clock information extracted from the video 240, by the identification of a shot-clock event (e.g., the decrementing from 11 seconds to 10 seconds). Another way to synchronize the two sources may be matching positional data of the ball, or other objects, extracted from both sources. Synchronization of out-of-band and in-band information then may allow for event triggered game enhancements by the video insertion model 220.

In addition to annotating the video-program, the system 200 may also output the detected events and their associated video segments to other destinations. For instance, one selected destination may be a searchable database 260 to facilitate automatic retrieval of video segments based on a desired event. Another possible destination may be a communication channel 270 for transmitting the final video-broadcast (e.g., the enhanced video-program) to a requesting user with annotations (e.g., enhancements) that may be customized to this specific user.

Thus, the exemplary system 200 allows for automatically annotating sports video using the event-based data extracted from various sources such as the frames of program video 240 (e.g., dashboard or other graphics overlaid or inlaid into the video as well as the video image itself) to provide a more efficient manner for content retrieval from a database video clips. Accordingly, video data may now be accessed based on game context, and the workflow in content-generation may be significantly reduced. For example, a user may search the database 260 for a video segment covering specific events automatically, saving the high labor involved in a manual search.

Figure 3:
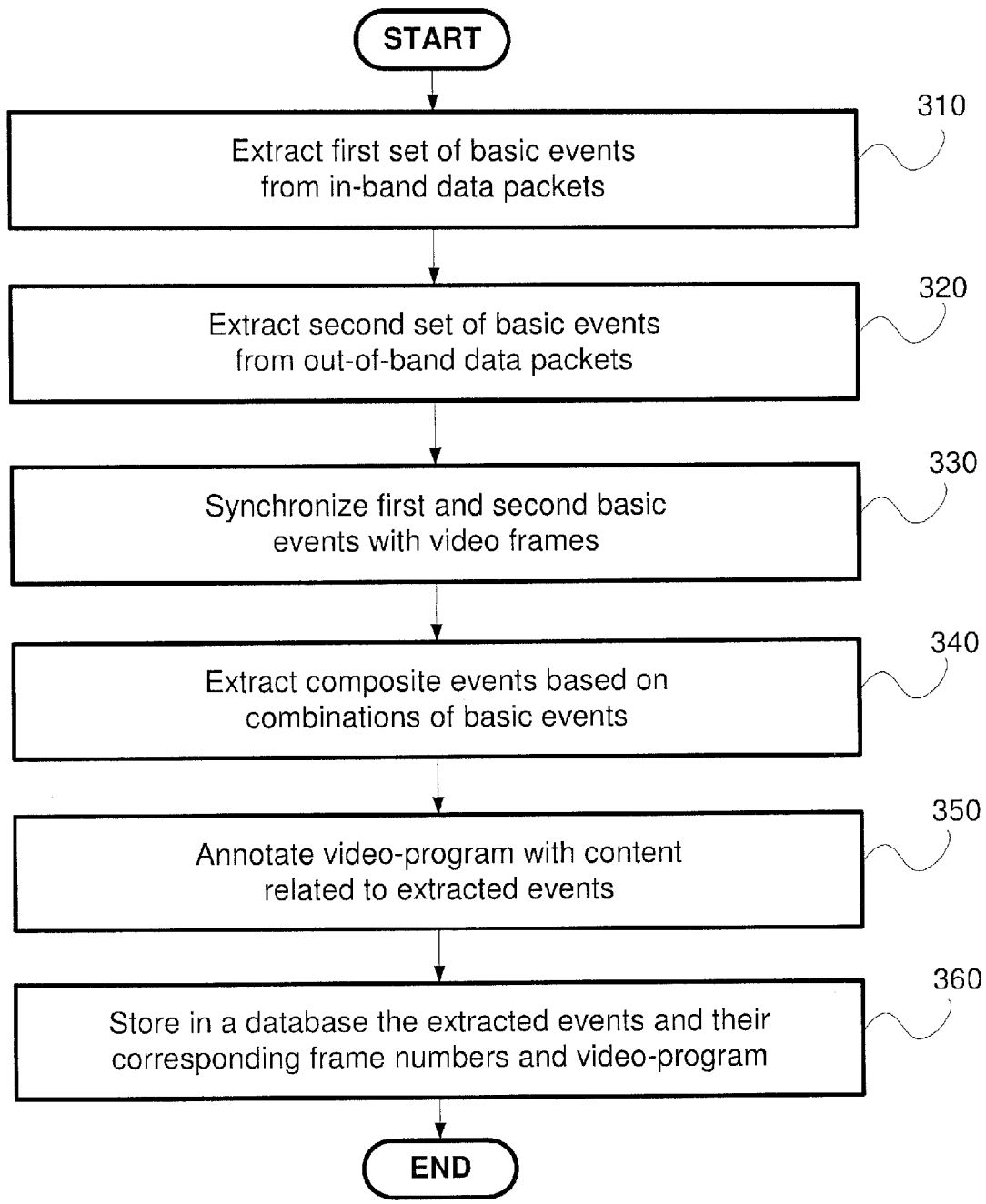
FIG. 3 shows an exemplary method for video event detection for contextual annotation and synchronization according to an exemplary embodiment.

FIG. 3 shows an exemplary method 300 for video event detection for contextual annotation and synchronization according to an exemplary embodiment. It should be noted that the exemplary method 300 will be discussed with reference to the system 200 and its components described for FIG. 2.

In step 310 a first set of basic events is detected by the event-based data extractor 210, possibly by using OCR module 215 to read information rendered within various overlaid/inlaid graphics. Other basic events, such as a ball positioned at a certain location at a certain time, may be extracted directly from the video-program image or from the ancillary in-band information (metadata). These basic events are tagged with the frame number they extracted from.

In step 320, a second set of basic events is detected by the event-based data extractor 210 through analysis of the out-of-band data packets. Data sent out-of-band may include all or part of the information provided by the dashboard and any other event/game related information as well as other streams of captured video or audio. For example, time dependent information such as game-clock, shot-clock, score, etc. may be transmitted, as well as a more static information such as names of participating players and their characteristics. Other spatio-temporal data measured by systems at the venue may be included. Note that basic events extracted from these data packets, being out-of-band, are not synchronized with the video-program frames.

In step 330, synchronization data identifying a location (e.g., a frame number, a timecode) within the video-program stream may be either derived or obtained. For instance, events within the first and second set that are time and space correlated may be used to synchronize the rest of the data in the in-band and out-band feeds, thereby tagging the events from the second set with their corresponding location in the video-program stream.

In step 340, the event-based data extractor 210 may extract composite events based on combinations of basic events. Thus, events from the first set and second set are analyzed and deduction is made resulting recognition of composite events. For example, basic events detected at a certain time, such as: 1) player A on court, 2) player A's position on court, 3) ball's position, 4) shot-clock state, and 5) game-score may result a composite event determining that player A performed a successful shot. It should be noted that steps 320-340 may be optional.

In step 350, the video insertion module 220 may enhance the broadcast video 240 with content related to either the basic or the composite events detected and synchronized in the previous steps. In step 360, the detected events that were tagged with frame number (in step 330) may be stored in a searchable database 260. The combination of events and their associated frame-numbers may be used to facilitate an automatic retrieval system with which a user may automatically index into a database retrieving a video segment containing a desired event.

Figure 4:
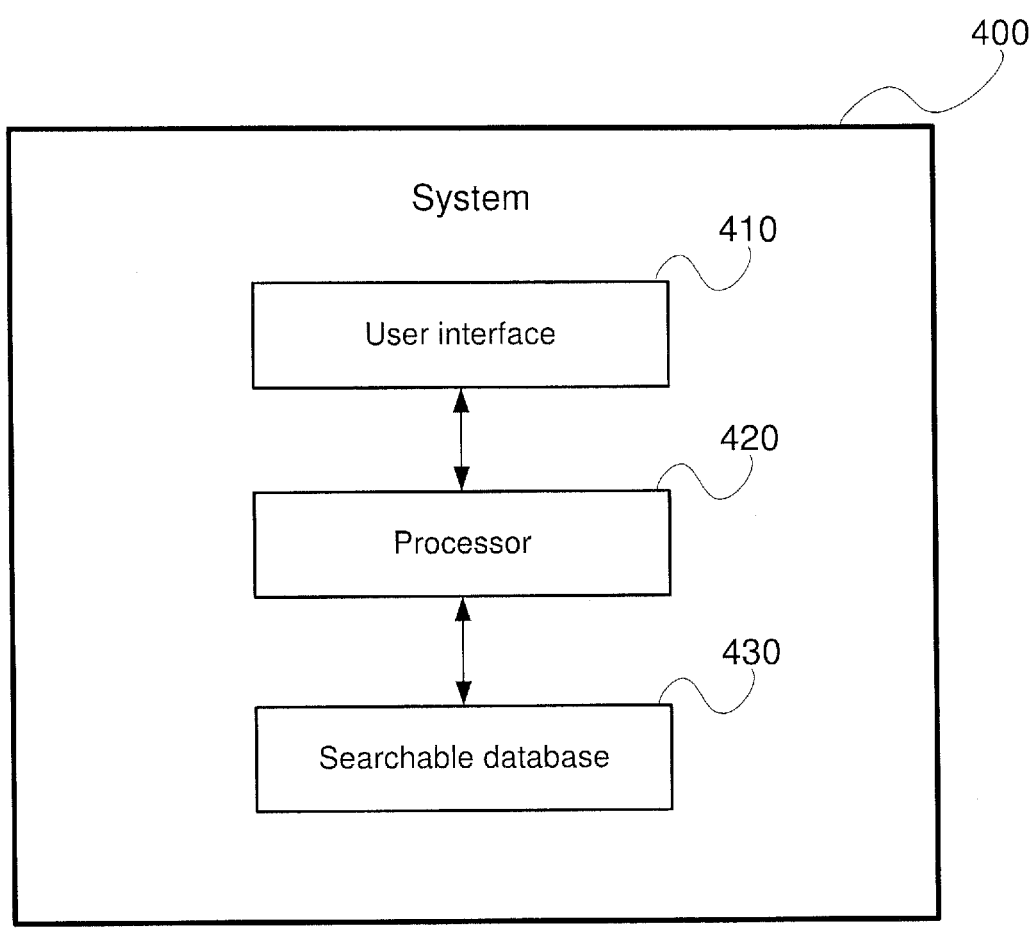
FIG. 4 shows an exemplary system for searching and retrieving a video segment associated with a desired event according to an exemplary embodiment.

FIG. 4 shows an exemplary system 400 for searching and retrieving a video segment associated with a desired event according to an exemplary embodiment. Specifically, the system 400 may include a user interface 410, a processor 420 and a searchable database 430. The user interface 410 may receive a query input indicating a desired event from a user of the system 400. The processor 420 may determine an index value identifying a location within the video stream corresponding to basic and/or composite events. Furthermore, the processor 420 may determine whether the desired event received from the user interface 420 exists in the searchable database 430 and may also retrieve a video segment with content associated with the desired event using the corresponding index value. The searchable database 430 may store video streams, as well as any combination of basic and/or composite events and their corresponding index values.

Therefore, the exemplary embodiments described above allow for the detection of specific events in the video, and for extraction of contextual information about the event for the particular sport. According to the exemplary embodiments described herein, data may now be used in a synchronized manner with video far downstream of the data creation source. This allows for a reduction in the system cost, since there is no requirement for a system to be at a remote location. Users of the exemplary systems and methods may now taking advantage of the asynchronous data that has already being generated on-site or somewhere else. Furthermore, by automatically annotating sports video using event data (e.g., the on-screen dashboard events), the systems and methods provide a way to perform content retrieval, such as within sporting video, more efficiently than currently exists. Thus, video may be accesses based on game context and workflows in content generation may be reduced significantly to save costs.

Those of skill in the art will understand that the above-described exemplary embodiments may be implemented in any number of matters, including as a software module, as a combination of hardware and software, etc. For example, the exemplary method 300 may be embodied in a program stored in a non-transitory storage medium and containing lines of code that, when compiled, may be executed by a processor.

It will be apparent to those skilled in the art that various modifications may be made to the exemplary embodiments, without departing from the spirit or the scope of the invention. Thus, it is intended that the present invention cover modifications and variations of this invention provided they come within the scope of the appended claims and their equivalents.

What is claimed is:

1. A method, comprising:
  receiving a video stream;
  extracting a first event from the video stream;
  determining an index value identifying a location within the video stream corresponding to the first event;
  inserting content based on the first event into the video stream at a location identified by the index value;
  receiving a second event from out-of-band data packets;
  wherein determining the index value includes correlating the first event with the second event; and
  wherein inserting content into the video stream includes at least one of,
    inserting content based on the first event; and
    inserting content based on the second event.

2. The method according to claim 1, wherein the first event includes a first set of events and the second event includes a second set of events.

3. The method according to claim 2, further comprising:
  extracting a composite event based on one or more events from one of the first set of events, the second set of events, and a combination thereof; and
  wherein inserting content into the video stream includes inserting content based on an composite event.

4. The method according to claim 3, further comprising:
  storing the video stream, the at least one of the first, second, and composite events and their corresponding index values in a searchable database.

5. The method according to claim 4, further comprising:
  receiving a query input indicating a desired event from a user via a user interface;
  determining whether the desired event exists in the searchable database; and
  retrieving a video segment with content associated with the desired event using the corresponding index value.

6. The method according to claim 1, wherein the extracting the first event from the video stream is based on an optical character recognition.

7. The method according to claim 1, wherein the extracting the first event includes data from at least one of a camera tracking technique, a player/object tracking technique, a detection of scene changes and a detection of a change in image pixels within frames of the video.

8. The method according to claim 1, wherein the first event is extracted from an on-screen dashboard.

9. The method according to claim 1, wherein the video stream is of a sporting event and the first event includes data related to an on-screen clock display.

10. A system, comprising:
  an event-based data extractor that receives a video stream and extracts a first event from the video stream;
  a processor that receives a second event from out-of-band data packets and correlates the first event with the second event to determine an index value identifying a location within the video stream corresponding to the first event; and
  a video insertion module that inserts content based on at least one of the first event and the second event into the video stream at a location identified by the index value.

11. The system according to claim 10, wherein the first event includes a first set of events and the second event includes a second set of events.

12. The system according to claim 11, wherein the event-based data extractor extracts a composite event based on one or more events from one of the first set of events, the second set of events, and a combination thereof; and wherein inserting content based on the at least one event into the video stream includes inserting content based on an composite event.

13. The system according to claim 12, further comprising:
  a searchable database storing the video stream, the at least one of the first, second or composite events and their corresponding index values.

14. The system according to claim 13, further comprising:
  a user interface that receives a query input indicating a desired event from a user; and
  wherein the processor determines whether the desired event exists in the searchable database and retrieves a video segment with content associated with the desired event using the corresponding index value.

15. The system according to claim 13, wherein the first event is extracted from an on-screen dashboard.

16. A non-transitory computer readable storage medium including a set of instructions executable by a processor, the set of instructions, when executed, resulting in a performance of the following:
- receiving a video stream;
- extracting a first event from the video stream;
- determining an index value identifying a location within the video stream corresponding to the first event;
- inserting content based on the first event into the video stream at a location identified by the index value; and
- receiving a second event from out-of-band data packets;
- wherein determining the index value includes correlating the first event with the second event, and wherein inserting content into the video stream includes at least one of, inserting content based on the basic event; and inserting content based on the further event.

17. The non-transitory computer readable storage medium of claim 16, wherein the set of instructions, when executed, further result in:
- extracting a composite event based on one or more events from one of a first set of events, a second set of events, and a combination thereof; and
- wherein inserting content based on the at least one event into the video stream includes inserting content based on the composite event.

* * * * *